United States Patent Office 3,393,599
Patented July 23, 1968

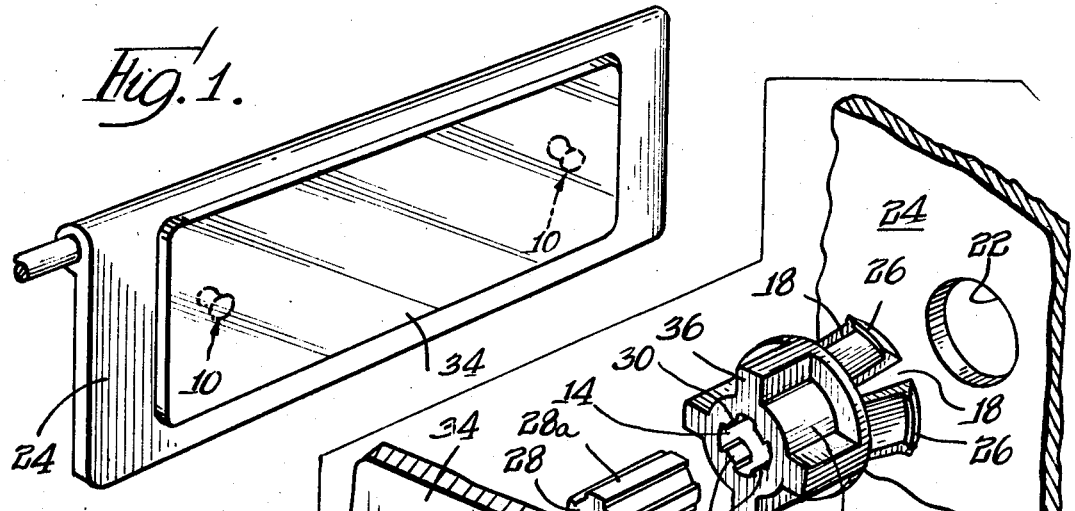

1

3,393,599
FASTENING DEVICE
Julian V. Fisher, Carpentersville, Ill., assignor to Illinois Tool Works Inc., Chicago, Ill., a corporation of Delaware
Filed Aug. 17, 1966, Ser. No. 573,101
8 Claims. (Cl. 85—72)

ABSTRACT OF THE DISCLOSURE

An embodiment of the invention is disclosed herein which consists of a one piece sleevelike plastic member adapted for insertion within a complementary aperture of a workpiece, and an outer peripheral shoulder positioned intermediate the extremities of the sleeve adapted to engage one side of the workpiece. The entering extremity of the sleeve is provided with an external shoulder for engaging the opposite side of a workpiece, said latter shoulder being radially yieldable so as to permit insertion of the sleeve within an aperture of smaller diameter than the maximum diameter of said shoulder. The internal periphery of the trailing extremity of the sleeve member is provided with circumferentially spaced abutments of limited axial dimension. The disclosed fastening device also includes a splined pin having longitudinal spline elements complementary to the circumferential space between adjacent abutments. The length of the pin is substantially less than the distance between the entering extremity of the sleeve and the annular shoulder means provided by the abutments, whereby, when the pin is fully inserted within the sleeve, a chamber area is presented within the sleeve between the trailing extremity of the pin and said annular shoulder means for accommodating a shouldered stud member.

---

This invention relates generally to fastener devices adapted to be used with panels and the like, and more particularly to fastening devices in the form of sleeve members adapted to be secured in workpieces such as panels through the agency of a pin inserted longitudinally within the sleeve member.

Various forms of fastener devices have heretofore been used which consist of a metallic or plastic sleeve member adapted to be inserted within a complementary aperture in a workpiece such as a panel, and subsequently secured in position within the workpiece by forcing a pin member into that portion of the sleeve which extends through the workpiece. It is an object of the present invention to provide a new and improved fastener device employing some of the structural features referred to above, but which, in addition, will provide a fastening support for a second workpiece such as a panel.

More specifically, the invention contemplates a fastener of the type referred to above which, in addition to being firmly secured in a supporting workpiece or panel, will also serve to interlock with a stud associated with a second workpiece.

Consider, for example, the problem of securing a mirror to the surface of a conventional sun visor of an automobile. The present invention contemplates a simple, yet dependable, fastener device which may be secured to the sun visor and which will also serve as means for detachably securing a mirror or the like to the visor. This is only one of many applications where a fastener device constructed in accordance with the teachings of the present invention greatly facilitates the ease with which a second workpiece may be detachably secured to a supporting workpiece such as the panel of a sun visor.

It is a further object of the present invention to provide a fastener and workpiece supporting device, just referred to, which may be very economically produced by the practice of conventional plastic molding methods as a one piece fastener unit, a portion of which is adapted for permanent assembly with a supporting workpiece or panel and another portion is adapted to detachably accommodate a stud member carried by the second workpiece.

The foregoing, and numerous other objects and advantages, will be more apparent from the following detailed description, when considered in connection with the accompanying drawing, wherein:

FIG. 1 is a perspective view disclosing a mirror secured to a sun visor panel by fastening devices constructed in accordance with the present invention;

FIG. 2 is a perspective exploded view of the fastener parts and the workpieces with which these parts are adapted to be assembled;

FIG. 3 is a longitudinal central sectional view of the fastener device contemplated by the present invention initially preassembled within the aperture of a workpiece and in readiness to be finally assembled therewith and secured thereto by applying pressure to the outer or trailing extremity of the fastener locking pin, a stud member carried by the second workpiece disclosed in readiness to engage and apply pressure to the pin;

FIG. 4 is a longitudinal sectional view similar to FIG. 3, disclosing the fastener parts in final preassembled relation with a workpiece panel, and a second workpiece or panel detachably secured through the agency of a stud member carried thereby and lodged within a chamber of the fastener device;

FIG. 5 is a fragmentary, elevational view of the fastener device as viewed from the right of FIG. 3, along the line 5—5 of that figure; and FIG. 6 is a detailed transverse sectional view of the fastener taken substantially along the line 6—6 of FIG. 3.

Referring now to the drawing more in detail, wherein like numerals have been employed to designate similar parts throughout the various figures, it will be seen that a fastening device representative of one embodiment of the present invention is designated generally by the numeral 10. The fastener device 10 consists of a sleevelike or tubular member 12 having a central longitudinal opening or bore 14. Extending radially outwardly and disposed intermediate the entering and trailing extremities of the sleeve 12 is a flange or shoulder member 16. The portion of the sleeve 12, at its right extremity as viewed in the various figures, is formed with a plurality of circumferentially spaced, longitudinal slots 18. The presence of the slots 18 serves to render the free extremity of that portion of the sleeve member 12 radially yieldable in response to lateral pressures exerted thereagainst. The right or entering extremity of the sleeve member 12 is beveled or chamfered to facilitate initial insertion of the member within an aperture 22 of a workpiece or panel 24.

For the purpose of illustrating one practical application of the invention, this panel 24 is in the nature of a conventional sun visor usually mounted in the vicinity of the upper margin of an automobile windshield. As the radially yieldable entering extremity of the sleeve 12 is telescopically associated with the aperture 22 of the sun visor 24, as seen in FIG. 3, so as to bring the shoulder or flange 16 into engagement with one side of the work panel 24, the opposite side of the panel becomes interlocked with shoulder members 26, which automatically spring radially outwardly into latching association with the workpiece. The fastener member 10 is now temporarily preassembled and interlocked with the opposed sides of the panel 24. A locking pin 28, either formed integrally with the sleeve 12 or partially inserted therein and thus frictionally held in place, may now be driven into the bore 14 so as to ultimately assume the final locking position as shown in FIG. 4. In this position the pin forces the resilient sleeve sections radially outwardly into firm impingement with the wall defining the work aperture 22. The shoulder 16 on one side and the circumferentially spaced shoulders 26 on the opposite side of the workpiece cooperate with the locking pin 28 to establish firm coupling of the fastener sleeve 12 with the workpiece or panel 24.

Particular attention is directed to the arrangement of longitudinal splines 28a provided along the outer surface of the locking pin 28. As these splines enter the bore 14 they pass between adjacent circumferentially spaced abutment member or lugs 30, extending radially inwardly from the wall of the bore 14. Thus as the locking pin 28 is driven into the bore 14, the abutments 30 remain undisturbed. The length of the pin 28 is substantially less than the overall length of the fastener 10 so that when the pin occupies its final locking position as shown in FIG. 4, an area or chamber remains between the trailing extremity of the pin and the abutments 30. The locking pin 28 may be shifted to its final locking position by means of a stud member 32 permanently associated with the mirror 34. As the stud member 32 is moved from the left position in FIG. 3 into engagement with the trailing extremity of the pin 28, it ultimately engages the circumferentially spaced abutments 30 positioned along the inner periphery of the bore 14. The inherent resiliency of the sleeve member 12 in this vicinity permits the abutments or lugs to spring radially outwardly until the area of maximum diameter of the stud is moved to the position shown in FIG. 4. In this position the lugs or abutments 30 have automatically sprung inwardly to their normal positions and in this position serve to prevent unauthorized separation of the stud member 34 of the mirror from the visor 24. It has been found desirable to employ a pair of fastening devices for each mirror, as shown in FIG. 1.

To lend desired strength to the fastener device it has been found advisable to employ longitudinally extending strengthening ribs 36, which are circumferentially spaced along the outer surface of the sleeve member 12. The portion of the sleeve member 12 extending circumferentially between each pair of strengthening ribs 36, as previously pointed out, is of sufficient inherent resiliency to permit radial flexing as the stud 32 of larger diameter, is forced past the abutments 30. The strengthening ribs 36 are preferably located radially opposite the areas extending circumferentially between the abutments 30 into which the splines 28a of the pin 28 pass, when the pin is driven into locking association with the fastener sleeve.

It will be apparent from the foregoing description that the locking pins 28, when driven to their final position at the entering extremity of the fastener sleeve, will be held in position due to the firm frictional contact between the inner wall of the sleeve and the periphery of the pins. Should breakage of the mirror occur, the detachment of the mirror may be made by simply urging the studs 32 outwardly against the frictional resistance of the abutments 30. It will also be apparent that the fastening device, including the sleeve member and its associated parts, may be made of one piece molded plastic material. The entering extremity of the pin 28 may either be molded as an integral part of the sleeve member 12 and connected thereto by a fracturable circumferential portion of stock, or it may be separate and frictionally held within the sleeve, in readiness to be shifted to locking position upon engagement therewith of the stud member 32.

From the foregoing description it should also be clear that the present invention provides a very practical and economical solution to the problem of attaching one workpiece or panel, as for example the mirror 34, to another workpiece or panel such as the sun visor 24. Obviously there are many other practical applications of the invention.

While for purposes of disclosure, one embodiment of the invention has been described herein, it will be understood that other modifications and changes are contemplated without departing from the spirit and scope of the appended claims.

The invention is claimed as follows:

1. A fastening device including a one piece sleevelike plastic member, a portion of which is adapted for insertion within a complementary aperture of a workpiece, as for example a panel, peripheral first shoulder means extending externally of the sleeve member for engaging one side of an apertured workpiece, second radially yieldable shoulder means at the entering end of said sleeve and spaced axially from said first shoulder means for engaging the opposite side of said workpiece, the opposite trailing extremity of said sleeve member having circumferentially spaced abutments of limited axial dimension extending along and terminating within the inner periphery thereof, so as to present annular shoulder means spaced axially inwardly from said trailing sleeve extremity, and a splined pin member having longitudinal spline elements complementary to the circumferential space between adjacent abutments and adapted to be inserted longitudinally within said circumferential spaces of the sleeve to a position in which the advancing extremity of the pin is adjacent said yieldable shoulder means, the length of said pin being substantially less than the distance between the entering extremity of the sleeve and the annular shoulder means provided by the abutments whereby, when said pin is fully inserted in the sleeve, a chamber area will be presented within the sleeve member between the trailing extremity of said pin and said annular shoulder means for accommodating a shouldered stud member.

2. A fastening device as set forth in claim 1, wherein the portions of the sleeve member in the vicinity of the abutments are inherently resilient, whereby to facilitate telescopic association of a stud member within the sleeve member.

3. A fastening device as set forth in claim 1, wherein the first shoulder means is located intermediate the extremities of the sleeve member.

4. A fastening device as set forth in claim 1, wherein the entering extremity of the sleeve member is longitudinally slotted to afford increased yieldability in that vicinity.

5. A fastening device as set forth in claim 1, wherein the trailing portion of the sleeve member extending between the abutments is of increased radial thickness to counteract radial expansion of the sleeve body in that vicinity.

6. A fastening device as set forth in claim 1, wherein the inner extremities of the circumferentially spaced abutments define a circle of less diameter than the maximum internal diameter of the remaining portion of the stud accommodating chamber in the sleeve member.

7. A fastening device as set forth in claim 1, wherein the diameter defined by the outer surfaces of the splines is such as to assure a snug fit of the pin within the entering extremity of the sleeve member and the diameter defined by the circumferential surface of the pin between the splines is not greater than the diameter defined by the inner extremities of the spaced abutments.

8. A fastening device as set forth in claim 1, wherein the internal diameter of the sleeve member at the yieldable entering end thereof is normally less than the maximum diameter of the splined pin, whereby to assure a snug fit of the sleeve member within a work aperture when the pin is fully inserted.

References Cited

UNITED STATES PATENTS

| | | | |
|---|---|---|---|
| 2,058,338 | 10/1936 | Meissner | 85—84 |
| 2,921,819 | 1/1960 | Rifkin | 85—82 |
| 2,941,439 | 6/1960 | Rapata | 85—72 |
| 3,105,407 | 10/1963 | Rapata | 85—84 |
| 3,319,510 | 5/1967 | Rapata | 85—72 |

EDWARD C. ALLEN, *Primary Examiner*.